(12) United States Patent
Inoue et al.

(10) Patent No.: US 11,703,189 B2
(45) Date of Patent: Jul. 18, 2023

(54) FLUID LEAKAGE DIAGNOSING DEVICE, FLUID LEAKAGE DIAGNOSING SYSTEM, FLUID LEAKAGE DIAGNOSING METHOD, AND RECORDING MEDIUM STORING FLUID LEAKAGE DIAGNOSING PROGRAM

(71) Applicant: NEC Corporation, Tokyo (JP)

(72) Inventors: Hirofumi Inoue, Tokyo (JP); Shigeki Shinoda, Tokyo (JP); Junichiro Mataga, Tokyo (JP); Katsumi Kikuchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 313 days.

(21) Appl. No.: 17/272,394

(22) PCT Filed: Sep. 2, 2019

(86) PCT No.: PCT/JP2019/034337
§ 371 (c)(1),
(2) Date: Mar. 1, 2021

(87) PCT Pub. No.: WO2020/050192
PCT Pub. Date: Mar. 12, 2020

(65) Prior Publication Data
US 2021/0325005 A1    Oct. 21, 2021

(30) Foreign Application Priority Data
Sep. 4, 2018    (JP) .................................. 2018-165442

(51) Int. Cl.
*F17D 5/06*    (2006.01)
*G01M 3/24*    (2006.01)

(52) U.S. Cl.
CPC ............... *F17D 5/06* (2013.01); *G01M 3/243* (2013.01)

(58) Field of Classification Search
CPC .. F17D 5/00; F17D 5/06; G01M 3/00; G01M 3/24; G01M 3/243
See application file for complete search history.

(56) References Cited

U.S. PATENT DOCUMENTS

| 5,416,724 A | * | 5/1995 | Savic | .................. G01M 3/24 702/54 |
| 6,567,006 B1 | | 5/2003 | Lander et al. | |

(Continued)

FOREIGN PATENT DOCUMENTS

| CN | 108506742 B | * | 7/2020 | ............... F17D 5/06 |
| JP | 2003-076393 A | | 3/2003 | |

(Continued)

OTHER PUBLICATIONS

Extended European Search Report for EP Application No. EP19858510.1 dated Sep. 23, 2021.

(Continued)

*Primary Examiner* — Nguyen Q. Ha
(74) *Attorney, Agent, or Firm* — Sughrue Mion, PLLC

(57) ABSTRACT

A fluid leakage diagnosing device includes: when fluid leakage relating to a pipeline is being diagnosed by employing adaptive signal processing to suppress a component of a disturbance vibration contained in a vibration measured at a prescribed location in the pipeline, an acquiring unit that acquires distribution information that is associated with a characteristic of the pipeline and represents an actual distribution result of a value of a parameter in the adaptive signal processing when performance of suppressing the component of the disturbance vibration satisfies a criterion; an estimating unit that, based on the distribution information, estimates a probability density at which the value of the parameter with which the performance satisfies the criterion exists; and a determining unit that, based on the probability (Continued)

density estimated by the estimating unit, determines a range to search for the value of the parameter in the adaptive signal processing.

10 Claims, 11 Drawing Sheets

(56) References Cited

U.S. PATENT DOCUMENTS

| | | | |
|---|---|---|---|
| 6,725,705 B1 * | 4/2004 | Huebier | G01M 3/243 73/592 |
| 2003/0165273 A1 | 9/2003 | Berkner et al. | |
| 2015/0253215 A1 | 9/2015 | Tomiyama et al. | |
| 2015/0300907 A1 | 10/2015 | Giunta et al. | |

FOREIGN PATENT DOCUMENTS

| | | | |
|---|---|---|---|
| JP | 2003-230012 A | 8/2003 | |
| JP | 2004-125628 A | 4/2004 | |
| JP | 2004125628 A * | 4/2004 | F17D 5/06 |
| JP | 2006-138638 A | 6/2006 | |
| JP | 2014-219342 A | 11/2014 | |
| WO | 2014/051036 A1 | 4/2014 | |
| WO | WO-2016152131 A1 * | 9/2016 | G01M 3/24 |

OTHER PUBLICATIONS

Yumei Wen et al., "Information processing in buried pipeline teak detection system", Information Acquisition, 2004, Proceedings, International Conference O N Hefei, China Jun. 21-25, 2004. Piscataway, NJ, USA, IEEE, Jun. 21, 2004 (Jun. 21, 2004), pp. 489-493.

Zhonghu Li et al., "Research of adaptive algorithm in water supply pipeline leak location", 2017 IEEE International Conference on Signal Processing, Communications and Computing (ICSPCC), IEEE, Oct. 22, 2017 (Oct. 22, 2017), pp. 1-5.

International Search Report tor PCT Application No. PCT/JP2019/034337, dated Nov. 19, 2019.

English translation of Written opinion for PCT Application No. PCT/JP2019/034337, dated Nov. 19, 2019.

* cited by examiner

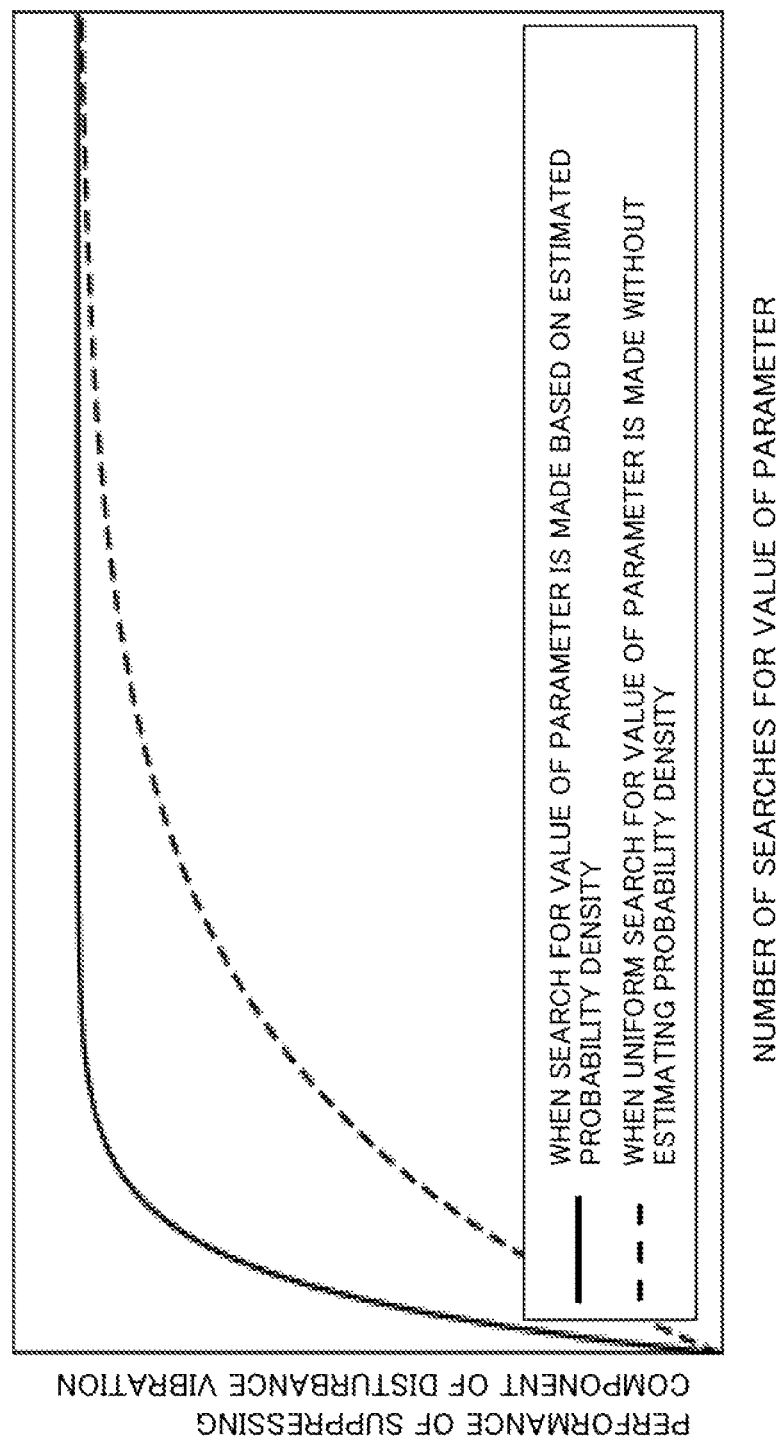

FLUID LEAKAGE DIAGNOSING DEVICE, FLUID LEAKAGE DIAGNOSING SYSTEM, FLUID LEAKAGE DIAGNOSING METHOD, AND RECORDING MEDIUM STORING FLUID LEAKAGE DIAGNOSING PROGRAM

This application is a National Stage Entry of PCT/JP2019/034337 filed on Sep. 2, 2019, which claims priority from Japanese Patent Application 2018-165442 filed on Sep. 4, 2018, the contents of all of which are incorporated herein by reference, in their entirety.

TECHNICAL FIELD

The present invention relates to a technique for diagnosing fluid leakage in a pipeline based on a vibration propagating through the pipeline.

BACKGROUND ART

In modem society, aging infrastructure is a serious social issue. For example, in a pipeline network that transports resources such as water, oil, and gas, there are many pipelines that are used beyond their service life, and this brings about issues of fluid leakage, a pipeline rupture accident, and the like due to deterioration of these pipelines.

In order to locate such issues at an early stage and prevent damage, and to minimize damage even when damage has occurred, it is necessary to diagnose the pipelines periodically for fluid leakage. One common method of diagnosing fluid leakage is a method utilizing a vibration propagating through the pipelines. In this method, using a vibration that has been produced by fluid leakage from a pipeline and is propagating through the pipeline, the fluid leakage is detected by finding the vibration that has propagated to a prescribed location with a vibration sensor or the like. Such a method of using the vibration has the advantage that the leakage can be detected even at a location somewhat distant from the point where the fluid leaked. However, when there is a disturbance source (vibration generation source) that generates a disturbance vibration to the pipeline, the disturbance vibration is superimposed on the vibration caused by the leakage, and thus there is a disadvantage that it is difficult to detect the leakage by such a method. Therefore, a technique capable of detecting the leakage even in an environment where such a disturbance source exists is expected.

As a technique related to such a technique, PTL 1 discloses a leakage position detecting method that detects a position from which a fluid leaked in an underground buried pipeline network for transporting the fluid, using a signal of a leakage sound found by a vibration sensor. In this method, a plurality of pipeline installation vibration sensors is installed at intervals in a part of the pipeline, and one or more ground installation vibration sensors are installed on the ground surface or underground to measure a vibration on the ground. In this method, noise other than the leakage sound contained in a signal captured by the pipeline installation vibration sensor is removed using a signal captured by the ground installation vibration sensor. Then, in this method, the leakage position is specified by calculating differences between times taken by the obtained leakage sound signal to reach each of the plurality of pipeline installation vibration sensors.

PTL 2 discloses a noise removing method that removes external noise other than the leakage sound when searching for leakage, regardless of the working time or location. In this method, a signal in which the leakage sound and the external noise are mixed, which has been measured by a vibration sensor installed on the ground or a wall surface, and a signal mainly made up of external noise, which has been picked up by a microphone installed at an appropriate position on the ground, are separately subjected to fast Fourier transform. In this method, two signals made up of frequency components, which have been generated by Fourier transform, are subjected to arithmetic processing, whereby a composite signal in which external noise components are attenuated is generated. Then, in this method, the generated composite signal is subjected to inverse fast Fourier transform to generate an output signal from which the external noise has been removed.

PTL 3 discloses a leakage finding method for a buried pipeline tube that discriminates a leakage sound by separating the leakage sound from noise even when a continuous sound regarded as noise for the leakage sound is generated. This method includes a first vibration sensor that detects a vibration sound produced by fluid leakage from the buried pipeline tube, and a second vibration sensor that detects waveform information for subtracting a factor corresponding to noise from waveform information detected by the first vibration sensor. Additionally, the first vibration sensor is installed at an exposed part of a pipeline member of the buried pipeline tube, and the second vibration sensor is installed at a location near the first vibration sensor but not in contact with the pipeline member of the buried pipeline tube.

PTL 4 discloses a leakage detecting device including a first detecting unit and a second detecting unit, in order to suppress the influence of external vibration and to enhance the accuracy of leakage inspection. In this device, the first detecting unit is installed in a pipeline through which a fluid flows, and detects a vibration in a first direction to output a first signal indicating the magnitude of the vibration in the first direction. The second detecting unit is installed in the pipeline, and detects a vibration in a second direction different from the first direction, to output a second signal indicating the magnitude of the vibration in the second direction. Then, this device performs arithmetic processing using the first signal and the second signal.

CITATION LIST

Patent Literature

[PTL 1] JP 2004-125628 A
[PTL 2] JP 2006-138638 A
[PTL 3] JP 2014-219342 A
[PTL 4] WO 2014/051036 A

SUMMARY OF INVENTION

Technical Problem

For example, in the leakage position detecting method indicated by above-mentioned PTL 1, the sensors are installed at the disturbance source in addition to the pipeline to be diagnosed, and adaptive signal processing using an adaptive digital filter is performed to suppress (remove) a component of a disturbance vibration (noise other than the leakage sound). In this case, the higher the performance of suppressing the component of the disturbance vibration by the adaptive signal processing, the higher the accuracy of diagnosing the fluid leakage. Therefore, in order to efficiently enhance the accuracy of diagnosing the fluid leakage, it is a problem to efficiently enhance the performance of suppressing the component of the disturbance vibration, that is, to efficiently and properly set the values of parameters in the adaptive signal processing, such as the filter order and the step size. PTLs 1 to 4 do not particularly mention this problem. It is a principal object of the invention of the present application to provide a fluid leakage diagnosing device and the like that solve this problem.

Solution to Problem

A fluid leakage diagnosing device according to an aspect of the invention of the present application includes: when fluid leakage relating to a pipeline is diagnosed by employing adaptive signal processing to suppress a component of a disturbance vibration contained in a vibration measured at a prescribed location in the pipeline, acquiring means for acquiring distribution information that is associated with a characteristic of the pipeline and represents an actual distribution result of values of a parameter in the adaptive signal processing when performance of suppressing the component of the disturbance vibration satisfies a criterion; estimating means for, based on the distribution information, estimating a probability density at which the values of the parameter exists when the performance satisfies the criterion; and determining means for, based on the probability density estimated by the estimating means, determining a range to search for the values of the parameter in the adaptive signal processing.

From another standpoint to achieve the above-mentioned object, a fluid leakage diagnosing method according to an aspect of the invention of the present application is implemented by an information processing device, and includes: when fluid leakage relating to a pipeline is diagnosed by employing adaptive signal processing to suppress a component of a disturbance vibration contained in a vibration measured at a prescribed location in the pipeline, acquiring distribution information that is associated with a characteristic of the pipeline and represents an actual distribution result of values of a parameter in the adaptive signal processing when performance of suppressing the component of the disturbance vibration satisfies a criterion; based on the distribution information, estimating a probability density at which the values of the parameter exist when the performance satisfies the criterion; and based on the estimated probability density, determining a range to search for the values of the parameter in the adaptive signal processing.

From another standpoint to achieve the above-mentioned object, a fluid leakage diagnosing program according to an aspect of the invention of the present application causes a computer to execute: when fluid leakage relating to a pipeline is diagnosed by employing adaptive signal processing to suppress a component of a disturbance vibration contained in a vibration measured at a prescribed location in the pipeline, acquiring processing of acquiring distribution information that is associated with a characteristic of the pipeline and represents an actual distribution result of values of a parameter in the adaptive signal processing when performance of suppressing the component of the disturbance vibration satisfies a criterion; estimating processing of, based on the distribution information, estimating a probability density at which the values of the parameter exist when the performance satisfies the criterion; and determining processing of, based on the probability density estimated by the estimating processing, determining a range to search for the values of the parameter in the adaptive signal processing.

The invention of the present application can also be implemented by a computer-readable nonvolatile recording medium having the fluid leakage diagnosing program (computer program) stored thereon.

Advantageous Effects of Invention

The invention of the present application makes it possible to efficiently enhance the diagnostic accuracy when fluid leakage relating to a pipeline is diagnosed by employing adaptive signal processing to suppress a component of a disturbance vibration contained in a vibration measured in the pipeline.

BRIEF DESCRIPTION OF DRAWINGS

FIG. 11 is a graph exemplifying the performance of suppressing the component of the disturbance vibration with respect to the number of searches for a value of a parameter, between a case where a search for a value of a parameter is made based on the estimated probability density and a case where a uniform search for a value of a parameter is made without estimating the probability density.

EXAMPLE EMBODIMENT

Hereinafter, example embodiments of the invention of the present application will be described in detail with reference to the drawings.

First Example Embodiment

Figure 1:
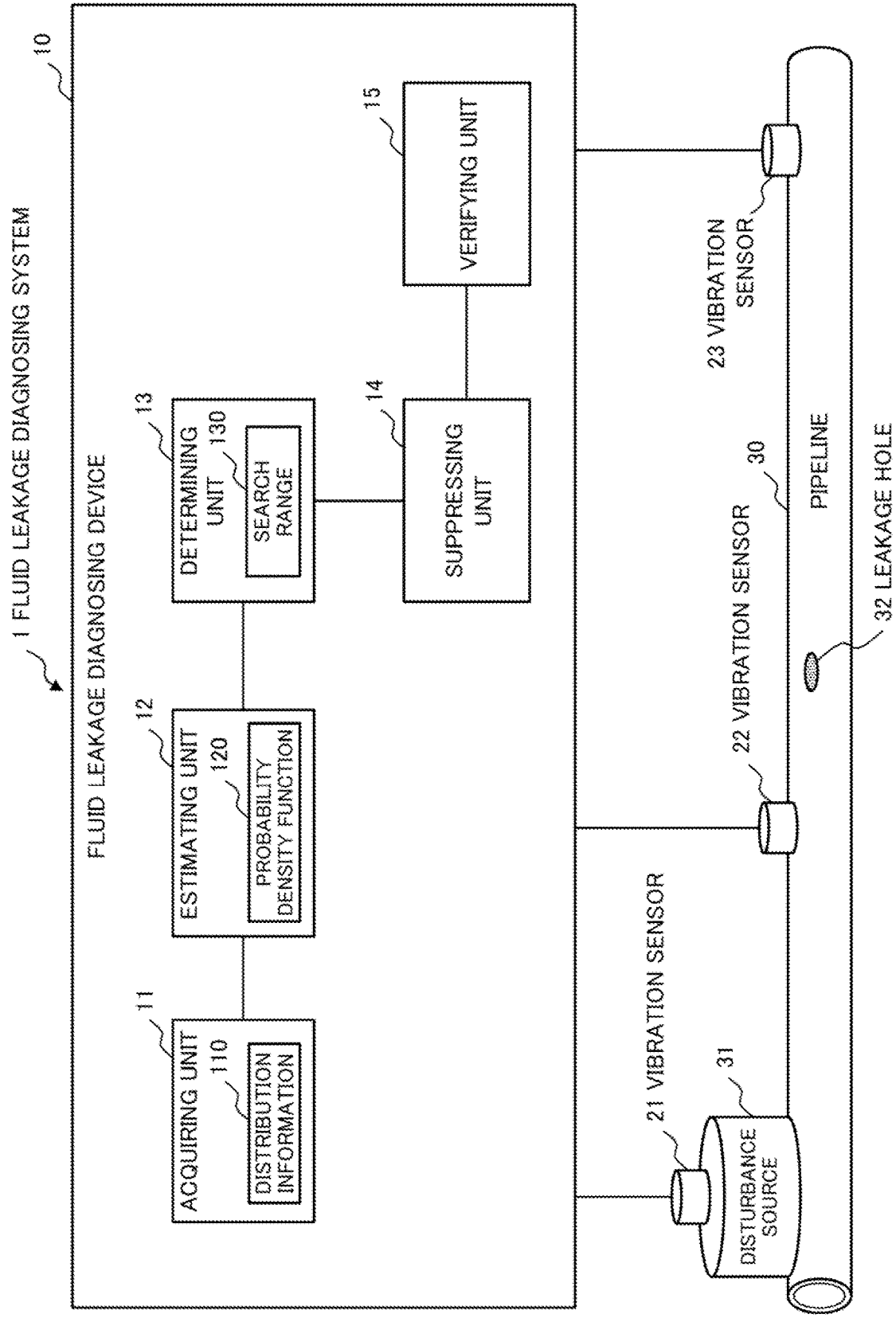
FIG. 1 is a block diagram illustrating a configuration of a fluid leakage diagnosing system 1 according to a first example embodiment of the invention of the present application.

FIG. 1 is a block diagram illustrating a configuration of a fluid leakage diagnosing system 1 according to a first example embodiment of the invention of the present application. The fluid leakage diagnosing system 1 is a system that diagnoses fluid leakage relating to a pipeline (pipeline tube) 30 based on a vibration propagating through the pipeline 30. The pipeline 30 includes, for example, a water pipe or a gas pipe. The pipeline 30 may have a more complicated shape than the shape exemplified in FIG. 1, such as a shape with a branch into a plurality of pipelines.

The fluid leakage diagnosing system 1 according to the present example embodiment roughly includes a fluid leakage diagnosing device 10 and vibration sensors 21 to 23 (measuring units). The fluid leakage diagnosing device 10 and the vibration sensors 21 to 23 are connected by wire or wirelessly such that mutual communication is enabled. Specifically, the vibration sensors 21 to 23 are, for example, piezoelectric acceleration sensors, electrodynamic acceleration sensors, capacitive acceleration sensors, optical speed sensors, or dynamic strain sensors. The number of vibration sensors included in the fluid leakage diagnosing system 1 is not limited to three, and for example, four or more vibration sensors may be included.

The vibration sensor 21 is installed near a disturbance source 31 (vibration generation source), and measures a disturbance vibration generated by the disturbance source 31. The vibration sensors 22 and 23 are installed at two ends of a section to be investigated for fluid leakage in the pipeline 30, and measure a vibration propagating through the pipeline 30. When a leakage hole 32 exists in the pipeline 30, the vibration propagating through the pipeline 30 is given as vibration in which the disturbance vibration generated by the disturbance source 31 is superimposed on a vibration generated by a fluid leaking from the leakage hole 32 (leakage vibration).

The vibration sensors 21 to 23 transmit data (information) representing the measured vibration to the fluid leakage diagnosing device 10. The fluid leakage diagnosing device 10 manages vibration data received from the vibration sensors 21 to 23 in association with the received time (the time when the data was measured) in order to perform processing described later.

The fluid leakage diagnosing device 10 includes an acquiring unit 11, an estimating unit 12, a determining unit 13, a suppressing unit 14, and a verifying unit 15.

The suppressing unit 14 uses data representing the disturbance vibration measured by the vibration sensor 21 to suppress (remove) the component of the disturbance vibration superimposed on the vibration measured by the vibration sensors 22 and 23 by performing adaptive signal processing. The suppressing unit 14 performs the processing using, for example, the least mean square (hereinafter referred to as LMS in the present application) method known as one representative example of the adaptive signal processing.

Figure 2:
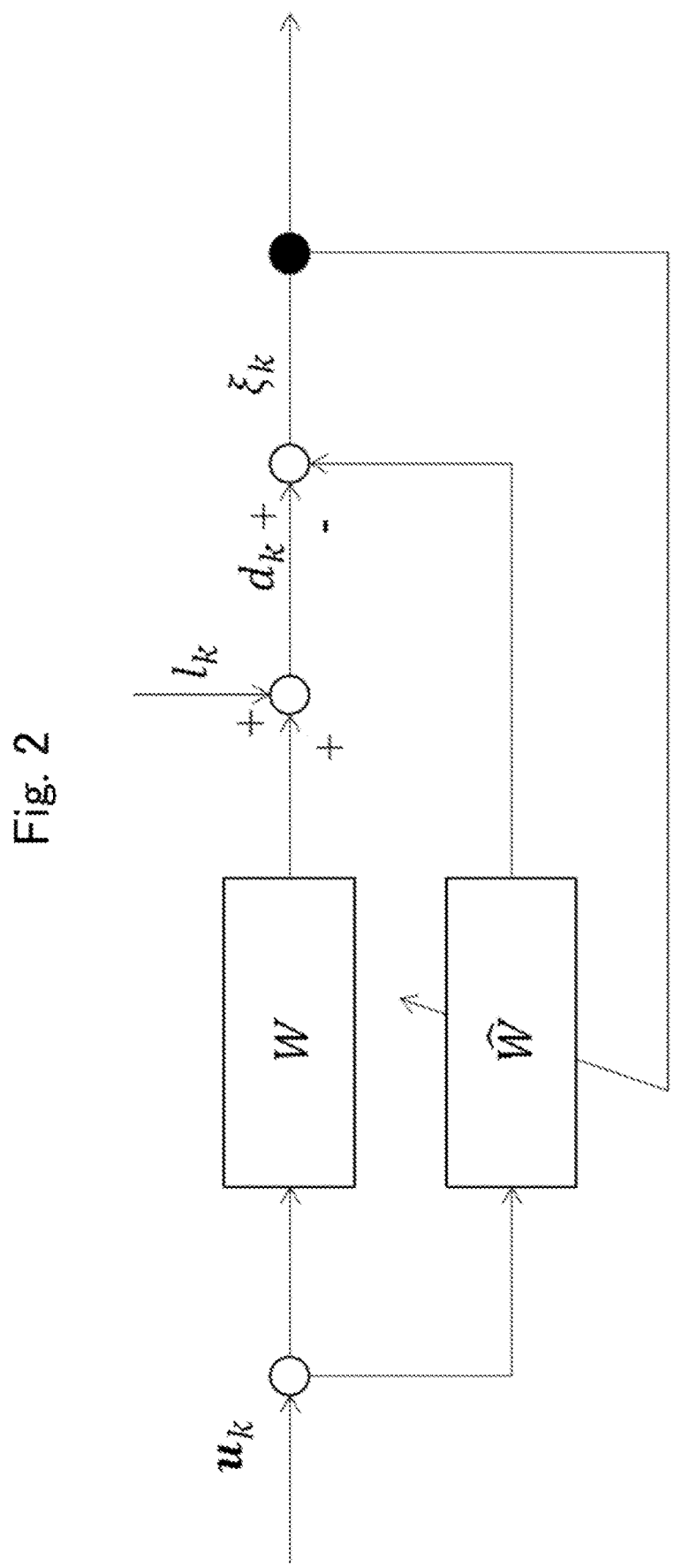
FIG. 2 is a block diagram explaining a least mean square (LMS) algorithm used by a suppressing unit 14 according to the first example embodiment of the invention of the present application to suppress a component of a disturbance vibration.

FIG. 2 is a block diagram explaining an LMS algorithm used by the suppressing unit 14 according to the present example embodiment to suppress the component of the disturbance vibration. The suppressing unit 14 updates a filter coefficient $w_k$ in the LMS algorithm as indicated by formulas 1 and 2. In the formulas, k denotes an integer representing a time series.

$$w_k = w_{k-1} + \mu u_k \xi_k \quad \text{(Formula 1)}$$

$$\xi_k = d_k - w_{k-1}^T u_k \quad \text{(Formula 2)}$$

In formulas 1 and 2, $u_k$ denotes a data vector $[u_k, u_{k-1}, \ldots, u_{k-K+1}]^T$ representing the disturbance vibration measured by the vibration sensor 21, and K denotes the filter order. In formula 1, $\mu$ denotes a step size (a positive constant that determines the update amount of the filter coefficient) in the LMS algorithm. In formulas 1 and 2, $\xi_k$ denotes a suppressed vibration in which the component of the disturbance vibration in the vibration measured by the vibration sensor 22 (or the vibration sensor 23) is suppressed. In formula 2, $d_k$ denotes a desired signal representing the vibration measured by the vibration sensor 22 (or the vibration sensor 23). In formula 2, T denotes a sign representing a transposed vector.

As illustrated in FIGS. 1 and 2, the disturbance vibration $u_k$ generated in the disturbance source 31 (measured by the vibration sensor 21) is affected by a propagation path W in the pipeline 30, of which the vibration propagation characteristics are represented by the filter coefficient $w_k$, and becomes $w_k^T u_k$ after propagating to the vibration sensor 22 (or the vibration sensor 23). That is, the vibration measured by the vibration sensor 22 (or the vibration sensor 23) is a vibration in which $w_k^T u_k$ and a leakage vibration $l_k$ caused by the fluid leakage that has occurred in the leakage hole 32 overlap. Therefore, the suppressing unit 14 calculates a filter coefficient wˆ (in FIG. 2, the symbol "ˆ" is written directly above W) that allows the vibration $w_k^T u_k$ caused by the disturbance vibration $u_k$ to coincide with the desired signal $d_k$, using the LMS algorithm, thereby being able to suppress (remove) the component of the disturbance vibration superimposed on the vibration measured by the vibration sensors 22 and 23.

The suppressing unit 14 designates a value of a parameter in the LMS algorithm when performing the processing using the LMS algorithm. Representative parameters include the above-described step size $\mu$ and filter order K. Then, the performance of suppressing the component of the disturbance vibration (disturbance suppression performance) implemented by the processing using the LMS algorithm greatly depends on the values of these parameters.

For example, it is generally known that the larger the filter order K is, the more precisely the vibration propagation characteristics provided in the propagation path W from the disturbance source 31 to the vibration sensor 22 (or the vibration sensor 23) can be represented, while the disturbance suppression performance is conversely degraded when the filter order K is excessively increased. Therefore, the suppressing unit 14 may perform adaptive signal processing shifted in time between the vibration sensors 21 to 23, in order to improve the disturbance suppression performance without excessively increasing the filter order K.

The acquiring unit 11, the estimating unit 12, and the determining unit 13 according to the present example embodiment have a function that enables efficient acquisition of a proper (optimum) value of a parameter that allows the disturbance suppression performance to satisfy a criterion (for example, to be maximized) when the suppressing unit 14 performs the adaptive signal processing using the LMS method or the like.

The acquiring unit 11 acquires distribution information 110 from the outside, for example. The distribution information 110 may be input, for example, by an input operation to a management terminal device (not illustrated) by an administrator of the fluid leakage diagnosing device 10 to the acquiring unit 11. The acquiring unit 11 may store the acquired distribution information 110 in a storage device (not illustrated), such as an electronic memory or a magnetic disk, included in the fluid leakage diagnosing device 10 or an external device.

The distribution information 110 is information representing an actual result relating to a combination of values of parameters with which the disturbance suppression performance satisfies a criterion, in association with the type of the pipeline 30 (pipeline type). Note that the pipeline type represents a classification based on physical characteristics provided in the pipeline 30. The physical characteristics provided in the pipeline 30 include, for example, the diameter, the material, or the pipeline length relating to the pipeline 30.

In the LMS algorithm for diagnosing the pipeline 30 for fluid leakage, a proper parameter that allows the disturbance suppression performance to satisfy a criterion has relevance to the physical characteristics provided in the pipeline 30. For example, the filter order K has relevance to the vibration propagation characteristics of the pipeline 30 from the disturbance source 31 to the vibration sensor 22 (or the vibration sensor 23). In turn, the vibration propagation characteristics of the pipeline 30 greatly depend on the above-mentioned physical characteristics provided in the pipeline 30. Therefore, generally, the value of the parameter with which the disturbance suppression performance satisfies the criterion differs greatly for each pipeline type.

Figure 3:
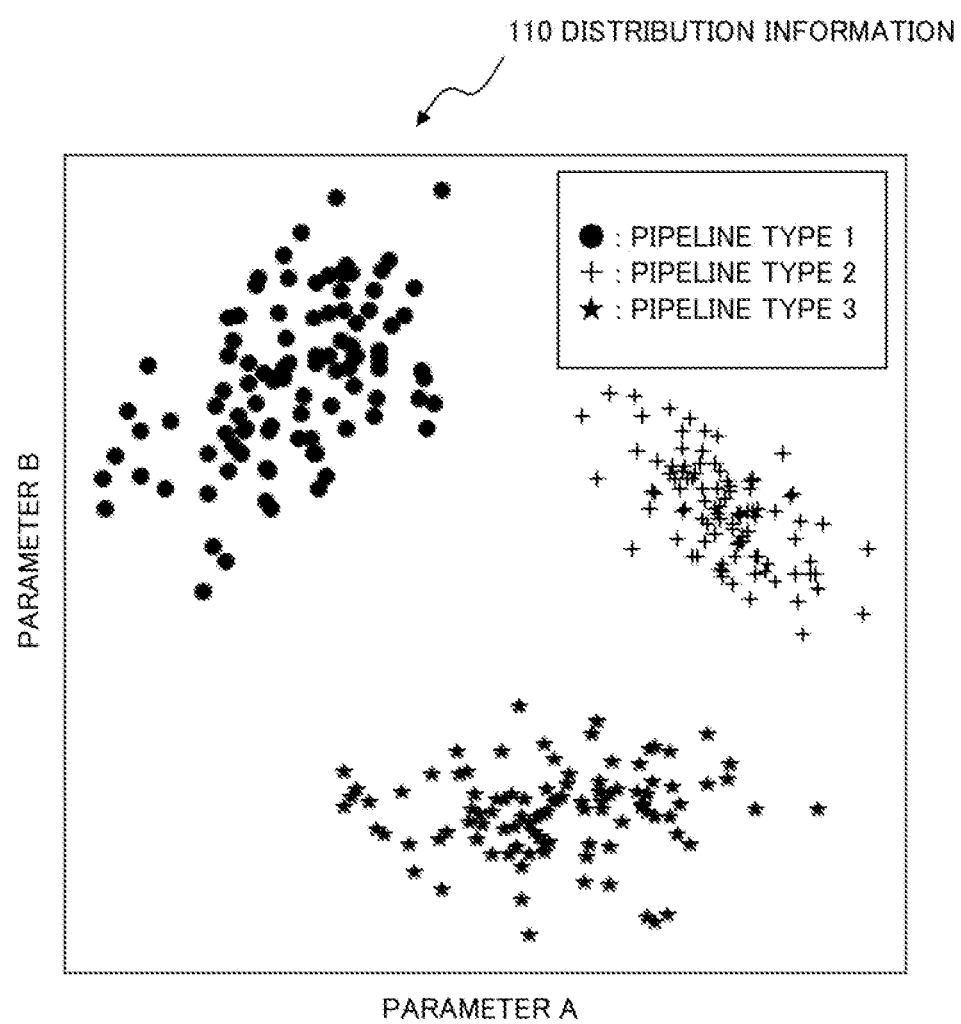
FIG. 3 is a diagram exemplifying distribution information 110 according to the first example embodiment of the invention of the present application.

FIG. 3 is a diagram exemplifying the distribution information 110 according to the present example embodiment as a graph. As exemplified in FIG. 3, the distribution information 110 indicates (plots) actual results relating to a proper combination of a value of a parameter A and a value of a parameter B that allows the disturbance suppression performance to satisfy a criterion, in association with three pipeline types. The parameters A and B in FIG. 3 are, for example, the step size $\mu$ and the filter order K described above.

Based on the distribution information 110, the estimating unit 12 estimates a function (probability density function 120) representing a probability density at which a proper combination of values of parameters that allows the disturbance suppression performance to satisfy a criterion exists, for each pipeline type. The estimating unit 12 estimates the probability density function 120 using, for example, a maximum likelihood estimation method or a kernel density estimation method. Since the maximum likelihood estimation method and the kernel density estimation method are well-known approaches, detailed description thereof is omitted in the present application.

Figure 4:
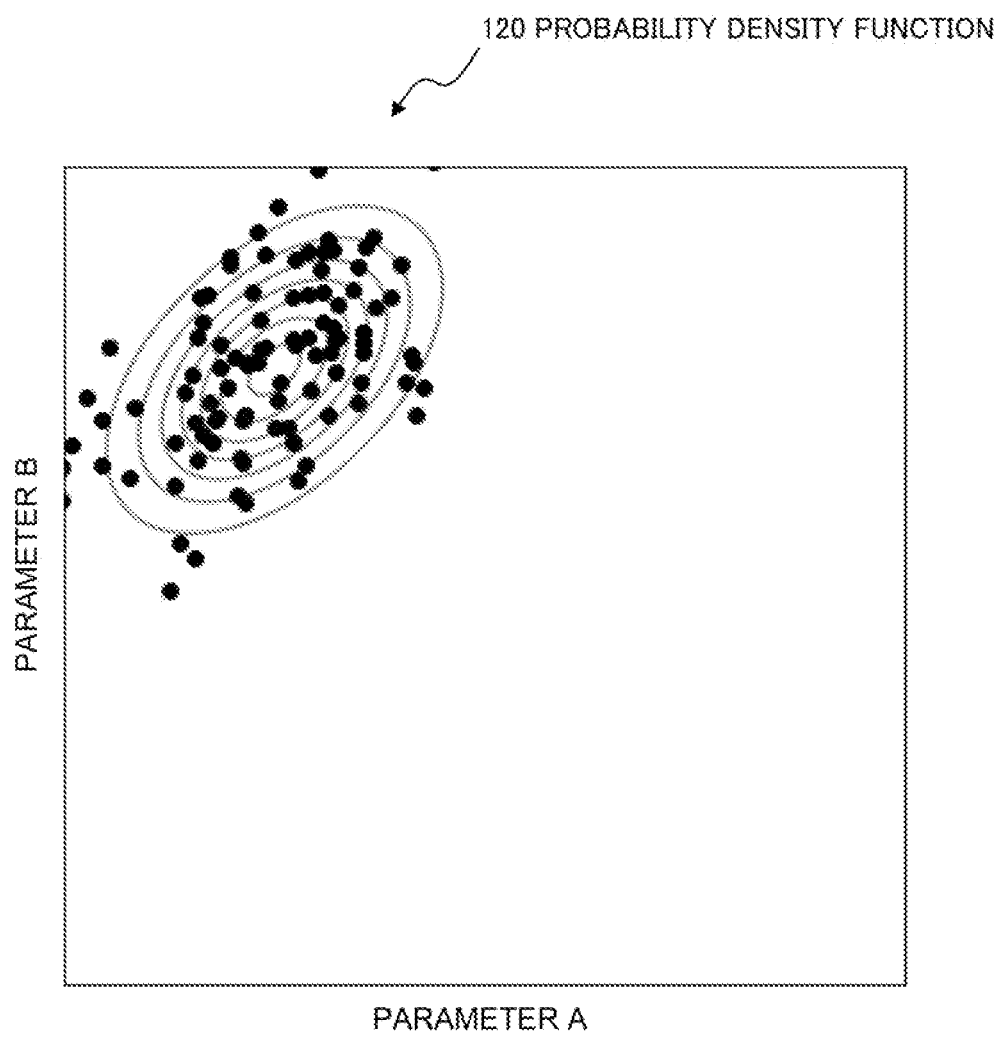
FIG. 4 is a diagram exemplifying a probability density function 120 estimated by an estimating unit 12 according to the first example embodiment of the invention of the present application, with regard to a pipeline type 1 based on the distribution information 110 exemplified in FIG. 3.

FIG. 4 is a diagram exemplifying the probability density function 120 estimated by the estimating unit 12 according to the present example embodiment with regard to the pipeline type 1, based on the distribution information 110 exemplified in FIG. 3. As exemplified in FIG. 4, the estimating unit 12 estimates, for example, the probability density function 120 represented as contour lines relating to the probability density (a plurality of lines represented by sets of points having the same probability density values). The probability density function 120 exemplified in FIG. 4 indicates that the probability density rises as an ellipse constituting the contour line is positioned closer to the center among a plurality of the ellipses. The estimating unit 12 also estimates the probability density function 120 for pipeline types 2 and 3 in a manner similar to the pipeline type 1.

Based on the probability density function 120, the determining unit 13 determines a range (search range 130) to be searched by the suppressing unit 14 for a value of a parameter to be set in the adaptive signal processing using the LMS algorithm.

Figure 5:
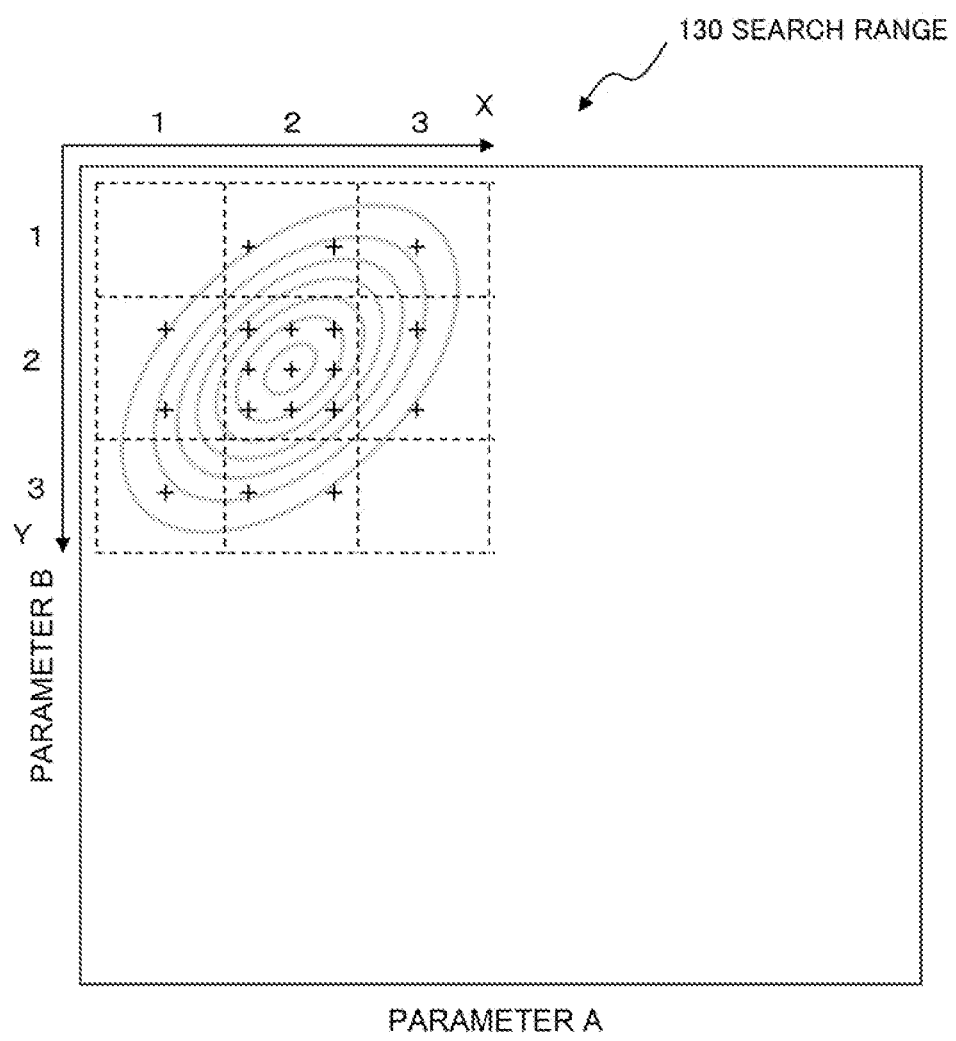
FIG. 5 is a diagram exemplifying a search range 130 relating to the pipeline type 1, which is determined by a determining unit 12 according to the first example embodiment of the invention of the present application, based on the probability density function 120 exemplified in FIG. 4.

FIG. 5 is a diagram exemplifying the search range 130 relating to the pipeline type 1, which is determined by the determining unit 13 according to the example embodiment, based on the probability density function 120 exemplified in FIG. 4.

As illustrated in FIG. 5, the determining unit 13 divides (for example, equally divides) a parameter space in which a combination of a value of the parameter A and a value of the parameter B is distributed, into a plurality of regions. At this time, the determining unit 13 only needs to treat a rectangular region in which the contour lines represented by the probability density function 120 exist, as an object to be divided, and in the example illustrated in FIG. 5, divides the parameter space into nine regions. Hereinafter, in the present application, by defining a positive direction relating to the value of the parameter A as an X-axis direction and a negative direction relating to the value of the parameter B as a Y-axis direction, it is assumed that the nine divided regions are represented as regions (X, Y) using values that discriminate sections in the X-axis direction and the Y-axis direction.

The determining unit 13 calculates an average value of the probability density calculated by the probability density function 120 for each divided region. According to the contour lines represented by the probability density function 120 exemplified in FIG. 5, a region having the highest average value is a region (2, 2) located at the center of the region before being divided. Then, a region having the second highest average value is a region (2, 1), a region (2, 3), a region (1, 2), and a region (3, 2) located above, below, right, and left of the region (2, 2) in an XY plane representing the parameter space. A region having the third highest average value is a region (3, 1) located at the upper right of the region (2, 2) and a region (1, 3) located at the lower left of the region (2, 2) in the XY plane representing the parameter space. A region having the lowest average value is a region (1, 1) located at the upper left of the region (2, 2) and a region (3, 3) located at the lower right of the region (2, 2).

Based on the average values of the probability density function 120 calculated as described above, the determining unit 13 determines the search range 130 represented as "+" marks in the parameter space, for each region. The determining unit 13 determines, for example, the number of searches for a value of a parameter (the number of search points represented as the "+" marks) in each region, based on a previously given maximum number of searches for the suppressing unit 14 to search for a value of the parameter and the average value of the probability density function 120 for each region.

In the example illustrated in FIG. 5, the maximum number of searches is 19. The determining unit 13 allocates 19 search points to the nine regions in such a way that the allocated search points are proportional to the average values of the probability density function 120 of the divided regions. That is, the determining unit 13 allocates nine search points to the region (2, 2), allocates two search points to the region (2, 1), the region (2, 3), the region (1, 2), and the region (3, 2), and allocates one search point to the region (3, 1) and the region (1, 3). The determining unit 13 does not allocate any search point to the region (1, 1) and the region (3, 3). In each region, the determining unit 13 arranges the search points, for example, uniformly (evenly) in the XY plane representing the parameter space. The determining unit 13 determines the search range 130 for the pipeline types 2 and 3 in a manner similar to the pipeline type 1. The determining unit 13 may store the search range 130 representing the search points for each pipeline type in a storage device included in the fluid leakage diagnosing device 10 or an external device.

When the type of the pipeline 30 is the pipeline type 1, the suppressing unit 14 performs the adaptive signal processing using combinations of values of parameters indicated by the search points ("+" marks) in FIG. 5. The suppressing unit 14 adopts a result in which the disturbance suppression performance satisfies a criterion (for example, is maximized). With this result, the suppressing unit 14 generates data representing a suppressed vibration $\xi_k^{22}$ in which the component of the disturbance vibration contained in the vibration measured by the vibration sensor 22 is suppressed, and generates data representing a suppressed vibration $\xi_k^{23}$ in which the component of the disturbance vibration contained in the vibration measured by the vibration sensor 23 is suppressed.

The verifying unit 15 illustrated in FIG. 1 uses the data representing the suppressed vibration $\xi_k^{22}$ and the suppressed vibration $\xi_k^{23}$, which has been generated by the suppressing unit 14, to calculate cross-correlation R(i) between the suppressed vibration $\xi_k^{22}$ and the suppressed vibration $\xi_k^{23}$, as indicated by formula 3.

$$R(i) = \frac{\text{Cov}(\xi_k^{22}, \xi_{k-i}^{23})}{\sqrt{\text{Var}(\xi_k^{22})\text{Var}(\xi_{k-i}^{23})}} \quad \text{(Formula 3)}$$

In formula 3, Cov represents covariance and Var represents variance. In formula 3, i denotes an integer indicating a time difference relating to the time series k. When the leakage vibration generated by the fluid leaking from the leakage hole 32 is commonly contained in the suppressed vibration $\xi_k^{22}$ and the suppressed vibration $\xi_k^{23}$, the value of the cross-correlation R(i) relating to a difference between times taken by the leakage vibration to reach the vibration sensors 22 and 23 from the leakage hole 32 is raised. On the other hand, when a common vibration such as the leakage vibration is not contained in the suppressed vibration $\xi_k^{22}$ and the suppressed vibration $\xi_k^{23}$ (that is, no fluid leakage has occurred), the value of the cross-correlation R(i) is lowered. Subsequently, the verifying unit 15 verifies the presence or absence of the fluid leakage in the pipeline 30 based on the calculated cross-correlation R(i).

The verifying unit 15 can verify the presence or absence of the fluid leakage by performing a discriminant analysis based on, for example, the actual result value of the cross-correlation relating to an existing pipeline in which the occurrence of the fluid leakage has been confirmed and the actual result value of the cross-correlation relating to an existing pipeline in which no fluid leakage has occurred.

Next, the operation (processing) of the fluid leakage diagnosing device 10 according to the present example embodiment will be described in detail with reference to the flowcharts in FIGS. 6 and 7.

Figure 6:
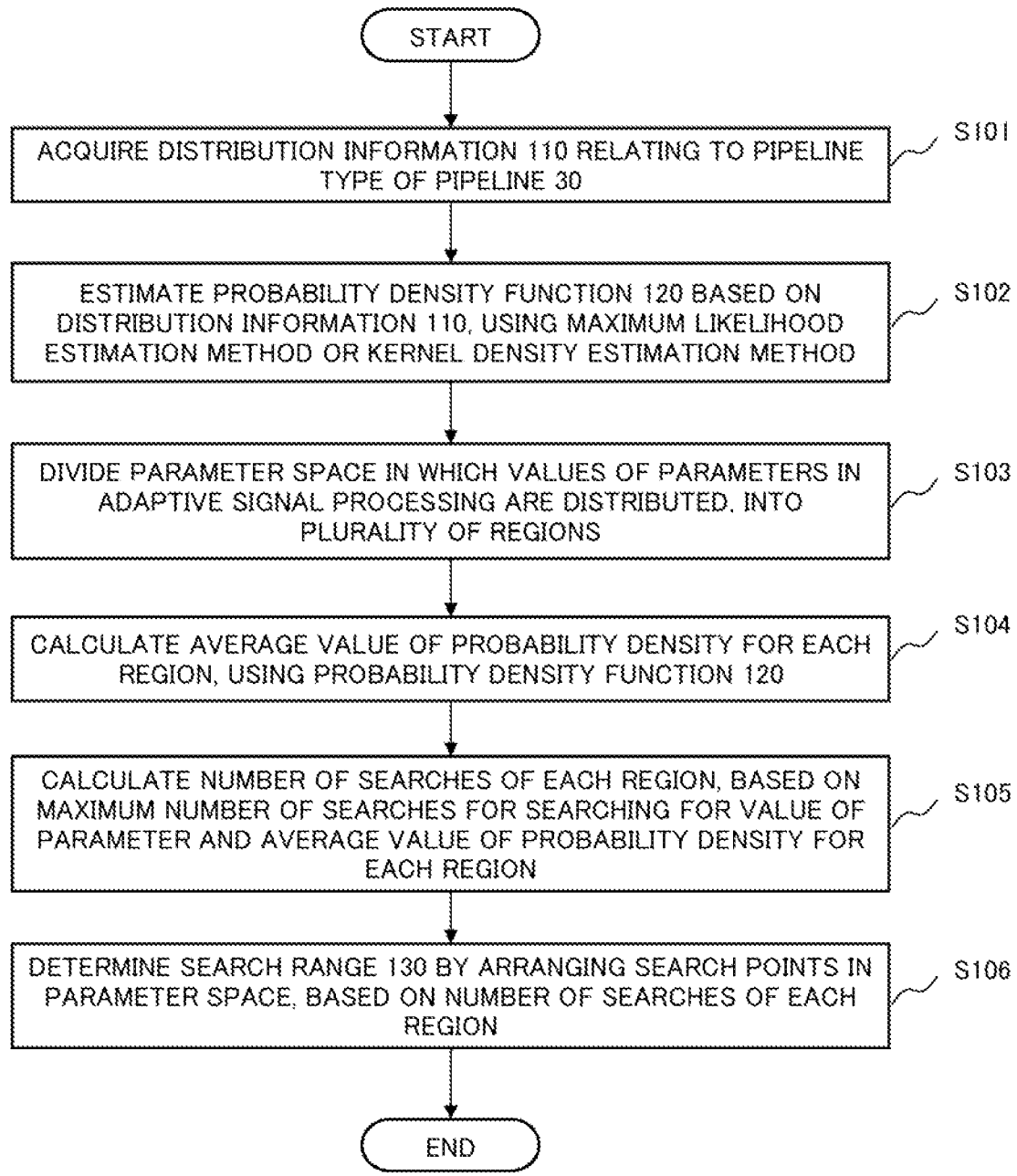
FIG. 6 is a flowchart illustrating an operation of the fluid leakage diagnosing device 10 according to the first example embodiment of the invention of the present application to determine the search range 130 for a value of a parameter in adaptive signal processing.

FIG. 6 is a flowchart illustrating an operation of the fluid leakage diagnosing device 10 according to the present example embodiment to determine the search range 130 for a value of a parameter in the adaptive signal processing.

The acquiring unit 11 acquires the distribution information 110 relating to the pipeline type of the pipeline 30, which represents the actual distribution result of a value of a parameter in the adaptive signal processing when the performance of suppressing the component of the disturbance vibration satisfies a criterion (step S101). The estimating unit 12 estimates the probability density function 120 representing a probability density at which the value of the parameter exists, based on the distribution information 110, by using the maximum likelihood estimation method or the kernel density estimation method (step S102).

The determining unit 13 divides the parameter space in which values of parameters in the adaptive signal processing is distributed, into a plurality of regions (step S103). The determining unit 13 calculates the average value of the probability density for each region, using the probability density function 120 (step S104).

The determining unit 13 calculates the number of searches for a value of a parameter in each region, based on the previously given maximum number of searches for searching for a value of a parameter and the average value of the probability density for each region (step S105). The determining unit 13 determines the search range 130 by arranging the search points in the parameter space, based on the number of searches of each region (step S106), and the entire processing ends.

Figure 7:
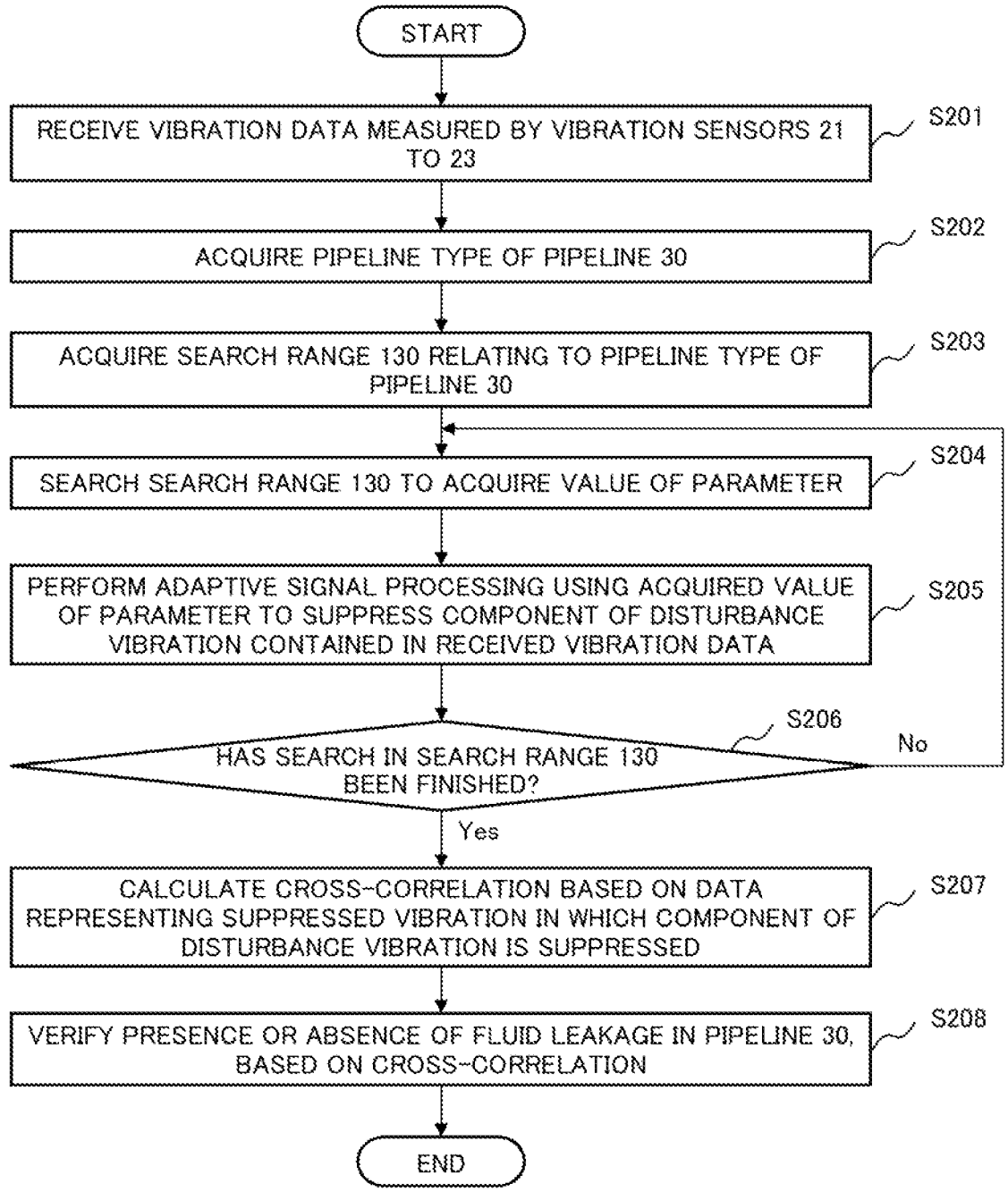
FIG. 7 is a flowchart illustrating an operation of the fluid leakage diagnosing device 10 according to the first example embodiment of the invention of the present application to acquire a value of a parameter in the adaptive signal processing based on the search range 130 and thereby diagnose fluid leakage in the pipeline 30.

FIG. 7 is a flowchart illustrating an operation of the fluid leakage diagnosing device 10 according to the present example embodiment to acquire a value of a parameter in the adaptive signal processing based on the search range 130 and thereby diagnose the fluid leakage in the pipeline 30.

The fluid leakage diagnosing device 10 receives the vibration data measured by the vibration sensors 21 to 23 (step S201). The suppressing unit 14 acquires the pipeline type of the pipeline 30 to be diagnosed for fluid leakage, from the outside (step S202). The suppressing unit 14 acquires the search range 130 relating to the pipeline type of the pipeline 30 (step S203).

The suppressing unit 14 searches the search range 130 to acquire a value of a parameter in the adaptive signal processing (step S204). The suppressing unit 14 performs the adaptive signal processing using the acquired value of the parameter to suppress the component of the disturbance vibration contained in the received vibration data (step S205).

When the suppressing unit 14 has not finished searching the search range 130 (No in step S206), the processing returns to step S204. When the suppressing unit 14 has finished searching the search range 130 (Yes in step S206), the verifying unit 15 calculates cross-correlation based on data representing suppressed vibration in which the component of the disturbance vibration is suppressed (step S207). The verifying unit 15 verifies the presence or absence of the fluid leakage in the pipeline 30, based on the cross-correlation (step S208), and the entire processing ends.

The fluid leakage diagnosing device 10 according to the present example embodiment can efficiently enhance the diagnostic accuracy when fluid leakage relating to a pipeline is diagnosed by employing the adaptive signal processing to suppress a component of a disturbance vibration contained in a vibration measured in the pipeline. The reason for this is that the fluid leakage diagnosing device 10 estimates a probability density at which a value of a parameter in the adaptive signal processing with which the disturbance suppression performance satisfies a criterion exists, based on an actual distribution result of the value of the parameter when the performance satisfies the criterion, and determines a range to search for the value of the parameter, based on the estimated probability density.

The effects implemented by the fluid leakage diagnosing device 10 according to the present example embodiment will be described in detail below.

There is a method of detecting a leakage position by installing sensors at a disturbance source in addition to a pipeline to be diagnosed for fluid leakage, and performing adaptive signal processing using an adaptive digital filter to suppress a component of a disturbance vibration. In this method, the higher the performance of suppressing the component of the disturbance vibration by the adaptive signal processing, the higher the accuracy of diagnosing the fluid leakage. Therefore, in order to efficiently enhance the accuracy of diagnosing the fluid leakage, it is a problem to efficiently enhance the disturbance suppression performance, that is, to efficiently and properly set the values of parameters in the adaptive signal processing, such as the filter order and the step size.

To cope with such a problem, the fluid leakage diagnosing device 10 according to the present example embodiment includes the acquiring unit 11, the estimating unit 12, and the determining unit 13, and operates as described above with reference to, for example, FIGS. 1 to 7. That is, the fluid leakage diagnosing device 10 is a device that diagnoses fluid leakage relating to the pipeline 30 by employing the adaptive signal processing to suppress a component of a disturbance vibration contained in a vibration measured at a prescribed location in the pipeline 30. The acquiring unit 11 acquires the distribution information 110 that is associated with the characteristics of the pipeline 30 and represents an actual distribution result of a value of a parameter in the adaptive signal processing when performance of suppressing the component of the disturbance vibration satisfies a criterion. Based on the distribution information 110, the estimating unit 12 estimates a probability density (probability density function 120) at which a value of a parameter with which the performance satisfies the criterion exists. Then, based on the probability density estimated by the estimating unit 12, the determining unit 13 determines a range (search range 130) for searching for a value of a parameter in the adaptive signal processing.

Figure 10:
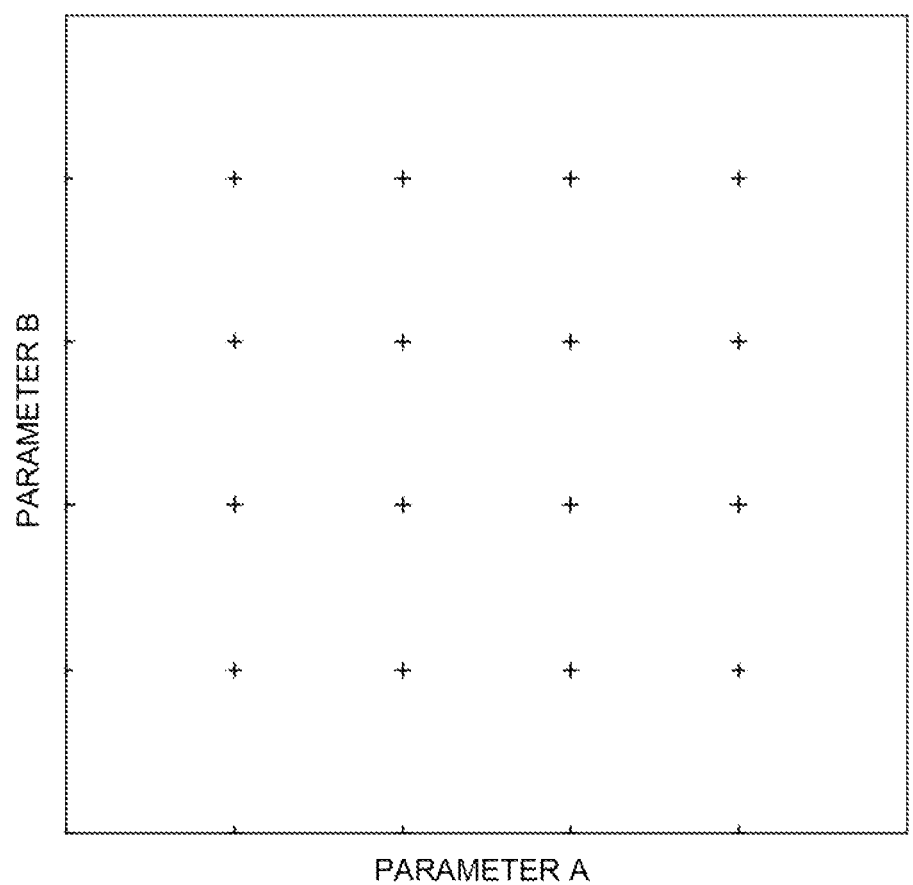
FIG. 10 is a diagram exemplifying a search range for a parameter by a general fluid leakage diagnosing device that uniformly searches for a value of a parameter without estimating a probability density.

FIG. 10 is a diagram exemplifying a search range for a value of a parameter by a general fluid leakage diagnosing device that uniformly searches for a value of a parameter without estimating the probability density described above. In FIG. 10, "+" marks represent search points in the parameter space. The general fluid leakage diagnosing device having the search range for a value of a parameter illustrated in FIG. 10 searches the parameter space for a value of a parameter, including a region where high disturbance suppression performance cannot be expected. In contrast to this, the fluid leakage diagnosing device 10 according to the present example embodiment having the search range for a value of a parameter illustrated in FIG. 5 densely searches a region of the parameter space where high disturbance suppression performance can be expected, for a value of a parameter. That is, the fluid leakage diagnosing device 10 according to the present example embodiment efficiently searches for a value of a parameter with which high disturbance suppression performance can be expected.

FIG. 11 is a graph exemplifying the disturbance suppression performance with respect to the number of searches for a value of a parameter, between a case where a search for a value of a parameter is made based on the estimated probability density (the fluid leakage diagnosing device 10 according to the present example embodiment) and a case where a uniform search for a value of a parameter is made without estimating the probability density (a general fluid leakage diagnosing device). As illustrated in FIG. 11, the fluid leakage diagnosing device 10 according to the present example embodiment can obtain high disturbance suppression performance even with a small number of searches, as compared with the general fluid leakage diagnosing device.

As described above, the fluid leakage diagnosing device 10 according to the present example embodiment can efficiently and properly set the values of parameters in the adaptive signal processing, such as the filter order and the step size, and accordingly can efficiently enhance the accuracy of diagnosing the fluid leakage relating to the pipeline 30.

The fluid leakage diagnosing device 10 according to the present example embodiment divides a parameter space in which values of parameters are distributed, into a plurality of regions, and calculates an average value of the probability density for each of the regions to determine the range for each of the regions to search, based on the calculated average value. Consequently, the fluid leakage diagnosing device 10 can more efficiently make proper setting of the value of a parameter in the adaptive signal processing.

In the above-described example embodiment, the parameter space searched by the fluid leakage diagnosing device 10 for a value of a parameter is a two-dimensional space, but the parameter space may be a multidimensional space with three or more parameters.

Second Example Embodiment

Figure 8:
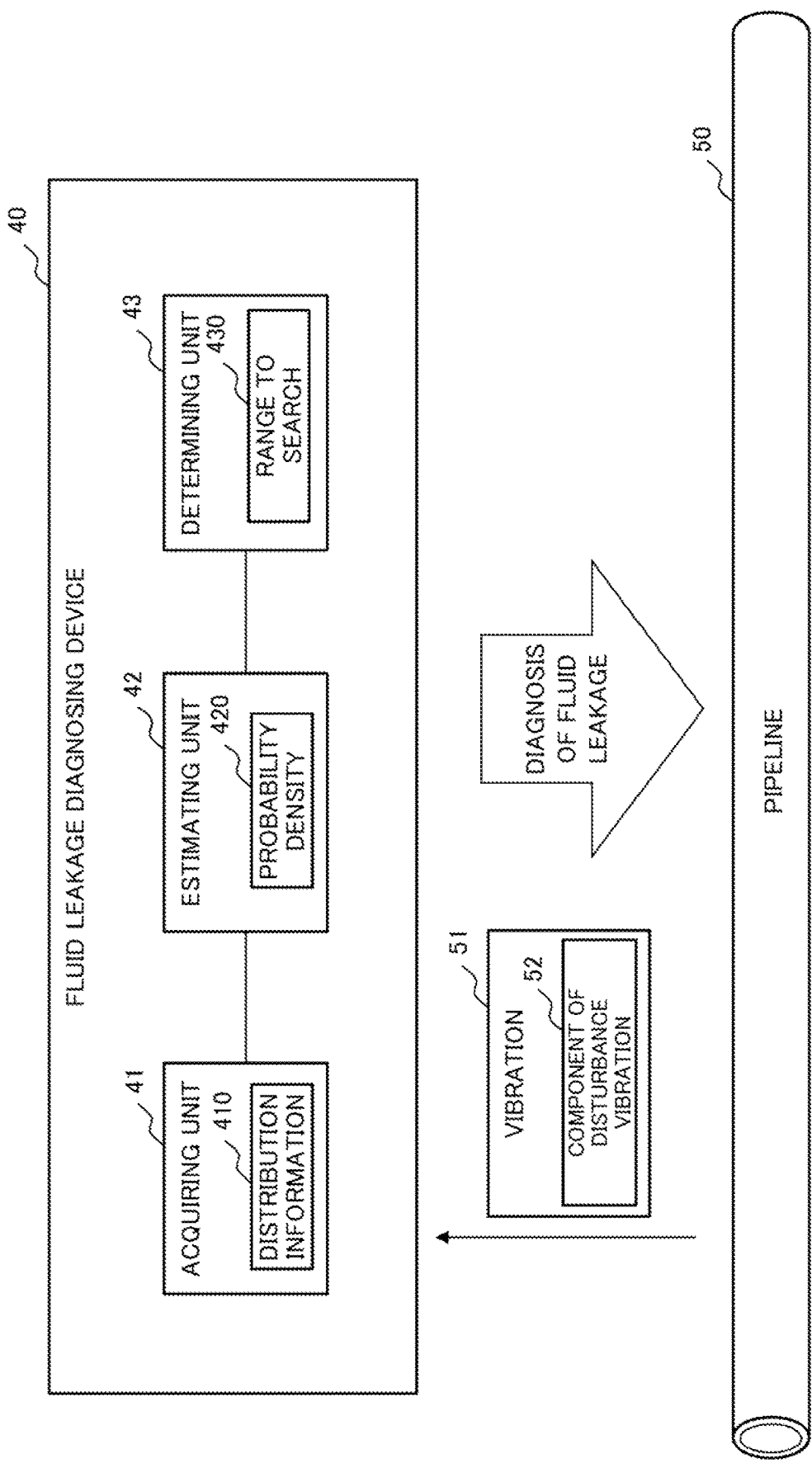
FIG. 8 is a block diagram illustrating a configuration of a fluid leakage diagnosing device 40 according to a second example embodiment of the invention of the present application.

FIG. 8 is a block diagram illustrating a configuration of a fluid leakage diagnosing device 40 according to a second example embodiment of the invention of the present application.

The fluid leakage diagnosing device 40 according to the present example embodiment is a device that diagnoses fluid leakage relating to a pipeline 50 by employing the adaptive signal processing to suppress a component 52 of a disturbance vibration contained in a vibration 51 measured at a prescribed location in the pipeline 50.

The fluid leakage diagnosing device 40 according to the present example embodiment includes an acquiring unit 41, an estimating unit 42, and a determining unit 43.

The acquiring unit 41 acquires distribution information 410 that is associated with the characteristics of the pipeline 50 and represents an actual distribution result of a value of a parameter in the adaptive signal processing when performance of suppressing the component 52 of the disturbance vibration satisfies a criterion.

Based on the distribution information 410, the estimating unit 42 estimates a probability density 420 at which a value of a parameter with which the performance satisfies the criterion exists.

Then, based on the probability density 420 estimated by the estimating unit 42, the determining unit 43 determines a range 430 to search for a value of a parameter in the adaptive signal processing.

The fluid leakage diagnosing device 40 according to the present example embodiment can efficiently enhance the diagnostic accuracy when fluid leakage relating to a pipeline is diagnosed by employing the adaptive signal processing to suppress a component of a disturbance vibration contained in a vibration measured in the pipeline. The reason for this is that the fluid leakage diagnosing device 40 estimates the probability density 420 at which a value of a parameter in the adaptive signal processing with which the performance of suppressing the component 52 of the disturbance vibration satisfies a criterion exists, based on an actual distribution result of the value of the parameter when the performance satisfies the criterion, and determines the range 430 to search for the value of the parameter, based on the estimated probability density 420.

<Hardware Configuration Example>

Each member of the fluid leakage diagnosing devices illustrated in FIGS. 1 and 8 in the above-described respective example embodiments can be implemented by dedicated hardware (HW) (electronic circuit). In FIGS. 1 and 8, at least the following components can be considered as functional (processing) units (software modules) of a software program.

Acquiring units 11 and 41,
Estimating units 12 and 42,
Determining units 13 and 43,
Suppressing unit 14, and
Verifying unit 15.

However, the division between these respective members illustrated in the drawings is for a configuration for convenience of explanation, and a variety of configurations can be presumed when actually equipped. An example of the hardware environment in this case will be described with reference to FIG. 9.

Figure 9:
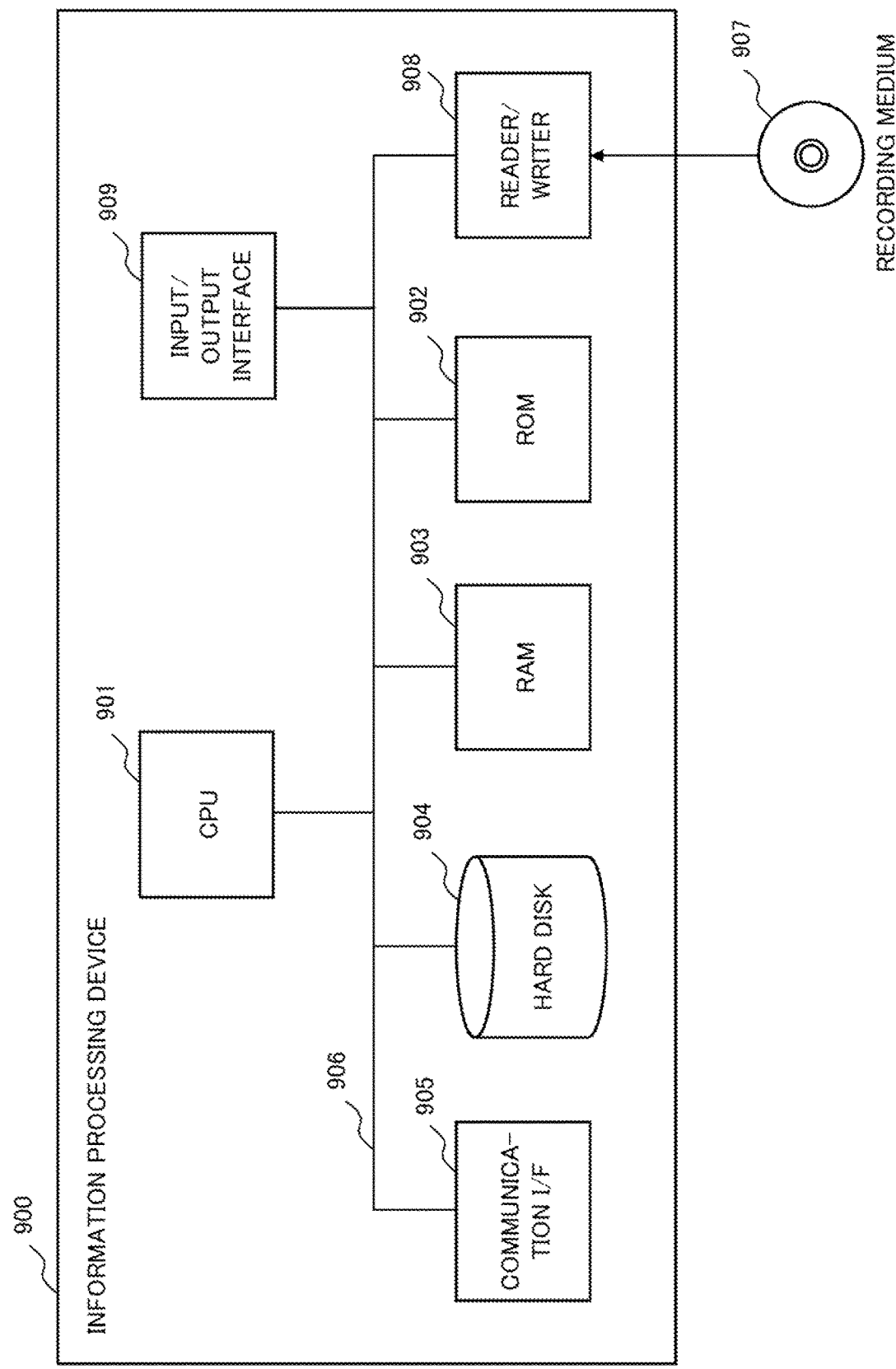
FIG. 9 is a block diagram illustrating a configuration of an information processing device 900 capable of executing the fluid leakage diagnosing device according to each example embodiment of the invention of the present application.

FIG. 9 is a diagram illustratively explaining a configuration of an information processing device 900 (computer) capable of executing the fluid leakage diagnosing device according to each example embodiment of the invention of the present application. That is, FIG. 9 represents a configuration of a computer (information processing device) capable of implementing the fluid leakage diagnosing devices illustrated in FIGS. 1 and 8, which is a hardware environment capable of implementing each function in the above-described example embodiments.

The information processing device 900 illustrated in FIG. 9 includes the following members as constituent elements.

Central processing unit (CPU) 901,
Read only memory (ROM) 902,
Random access memory (RAM) 903,
Hard disk (storage device) 904,
Communication interface 905,
Bus 906 (communication line),
Reader/writer 908 capable of reading and writing data stored in recording medium 907 such as compact disc read only memory (CD-ROM), and
Input/output interface 909 such as monitor, speaker, and keyboard.

That is, the information processing device 900 including the above constituent elements is a general computer in which these components are connected via the bus 906. The information processing device 900 includes a plurality of CPUs 901 or a CPU 901 constituted by a multi-core in some cases.

Then, the invention of the present application described using the above-described example embodiments as examples supplies a computer program capable of implementing the following functions to the information processing device 900 illustrated in FIG. 9. The functions are functions of the above-described components in the block configuration diagrams (FIGS. 1 and 8) referred to in the description of the example embodiments or functions in the flowcharts (FIGS. 6 and 7). The invention of the present application is achieved by thereafter reading, interpreting, and executing the supplied computer program in the CPU 901 of the hardware. The computer program supplied into the device can be stored in a readable and writable volatile memory (RAM 903) or a nonvolatile storage device such as the ROM 902 or the hard disk 904.

In the case described above, a general procedure in the present day can be adopted as a method of supplying the computer program into the hardware. Examples of the procedure include a method of installing the computer program into the device via various recording media 907 such as a CD-ROM, and a method of downloading the computer program from the outside via a communication line such as the Internet. Then, in such a case, the invention of the present application can be considered to be constituted by a code constituting the computer program or the recording medium 907 in which the above code is stored.

The invention of the present application has been described above with reference to the above-described example embodiments as typical examples. However, the invention of the present application is not restricted to the example embodiments described above. That is, the invention of the present application can apply a variety of aspects that can be understood by those skilled in the art, within the scope of the invention of the present application.

This application is based upon and claims the benefit of priority from Japanese patent application No. 2018-165442, filed on Sep. 4, 2018, the disclosure of which is incorporated herein in its entirety by reference.

REFERENCE SIGNS LIST

1 fluid leakage diagnosing system
10 fluid leakage diagnosing device
11 acquiring unit
110 distribution information
12 estimating unit
120 probability density function
13 determining unit
130 search range
14 suppressing unit
15 verifying unit
21 to 23 vibration sensor
30 pipeline
31 disturbance source
32 leakage hole
40 fluid leakage diagnosing device
41 acquiring unit
410 distribution information
42 estimating unit
420 probability density
43 determining unit
430 range to search
50 pipeline
51 vibration
52 component of disturbance vibration
900 information processing device
901 CPU
902 ROM
903 RAM
904 hard disk (storage device)
905 communication interface
906 bus
907 recording medium
908 reader/writer
909 input/output interface

What is claimed is:

1. A fluid leakage diagnosing device comprising:
at least one memory storing a computer program; and
at least one processor configured to execute the computer program to,
when fluid leakage relating to a pipeline is diagnosed by employing adaptive signal processing to suppress a component of a disturbance vibration contained in a vibration measured at a prescribed location in the pipeline,
acquire distribution information that is associated with a characteristic of the pipeline and represents an actual distribution result of values of a parameter in the adaptive signal processing when performance of suppressing the component of the disturbance vibration satisfies a criterion;
based on the distribution information, estimate a probability density at which the values of the parameter exists when the performance satisfies the criterion; and
based on the probability density estimated, determine a range to search for the values of the parameter in the adaptive signal processing.

2. The fluid leakage diagnosing device according to claim 1, wherein the processor is configured to execute the computer program to
estimate the probability density by employing a maximum likelihood estimation method or a kernel density estimation method.

3. The fluid leakage diagnosing device according to claim 1, wherein the processor is configured to execute the computer program to
divide a parameter space in which the values of the parameter are distributed, into a plurality of regions, and calculate an average value of the probability density for each of the regions to determine the range for each of the regions to search, based on the average value being calculated.

4. The fluid leakage diagnosing device according to claim 1, wherein
the characteristic of the pipeline includes a diameter, a material, or a pipeline length relating to the pipeline.

5. The fluid leakage diagnosing device according to claim 1, wherein the processor is configured to execute the computer program to
acquire the values of the parameter by searching the range determined, and suppress the component of the disturbance vibration contained in the vibration being measured by performing the adaptive signal processing using the values of the parameter being acquired.

6. The fluid leakage diagnosing device according to claim 5, wherein the processor is configured to execute the computer program to
use a least mean square method as the adaptive signal processing.

7. The fluid leakage diagnosing device according to claim 1, wherein the processor is configured to execute the computer program to
calculate cross-correlation based on suppressed vibrations relating to a plurality of the prescribed locations, in each of which the component of the disturbance vibration contained in the vibration being measured is suppressed, and
verify presence or absence of the fluid leakage based on the cross-correlation being calculated.

8. A fluid leakage diagnosing system comprising:
the fluid leakage diagnosing device according to claim 1; and
sensors for measuring the vibration, the sensors being installed at any location in a section to be investigated for the pipeline and at a generation source of the disturbance vibration.

9. A fluid leakage diagnosing method implemented by an information processing device,
the fluid leakage diagnosing method comprising:
when fluid leakage relating to a pipeline is diagnosed by employing adaptive signal processing to suppress a component of a disturbance vibration contained in a vibration measured at a prescribed location in the pipeline,
acquiring distribution information that is associated with a characteristic of the pipeline and represents an actual distribution result of values of a parameter in the adaptive signal processing when performance of suppressing the component of the disturbance vibration satisfies a criterion;
based on the distribution information, estimating a probability density at which the values of the parameter exists when the performance satisfies the criterion; and
based on the estimated probability density, determining a range to search for the values of the parameter in the adaptive signal processing.

10. A non-transitory computer-readable recording medium storing a fluid leakage diagnosing program that causes a computer to execute:
when fluid leakage relating to a pipeline is diagnosed by employing adaptive signal processing to suppress a component of a disturbance vibration contained in a vibration measured at a prescribed location in the pipeline,
acquiring processing of acquiring distribution information that is associated with a characteristic of the pipeline and represents an actual distribution result of values of a parameter in the adaptive signal processing when performance of suppressing the component of the disturbance vibration satisfies a criterion;
estimating processing of, based on the distribution information, estimating a probability density at which the values of the parameter exists when the performance satisfies the criterion; and
determining processing of, based on the probability density estimated by the estimating processing, determining a range to search for the values of the parameter in the adaptive signal processing.

* * * * *